United States Patent [19]

Ishimori et al.

[11] 4,243,641
[45] Jan. 6, 1981

[54] METHOD FOR RECOVERING LITHIUM FROM SEA WATER

[75] Inventors: Tomitaro Ishimori, Sekimachi; Kaoru Ueno, Katsuta, both of Japan

[73] Assignee: Japan Atomic Energy Research Institute, Tokyo, Japan

[21] Appl. No.: 944,696

[22] Filed: Sep. 22, 1978

[30] Foreign Application Priority Data

Nov. 7, 1977 [JP] Japan .............................. 52/132441

[51] Int. Cl.³ .............................................. C22B 26/12
[52] U.S. Cl. ................................... 423/179.5; 423/157
[58] Field of Search ...................... 423/157, 179.5, 181; 210/38 A, 38 R

[56] References Cited

U.S. PATENT DOCUMENTS

| | | | |
|---|---|---|---|
| 2,897,051 | 7/1959 | McIlhenny et al. | ................. 423/157 |
| 3,342,730 | 9/1967 | Mihara et al. | ..................... 210/38 A |
| 3,618,589 | 11/1971 | Tavani | .............................. 210/38 A |

OTHER PUBLICATIONS

Kunin et al., Ion Exchange Resins, John Wiley & Sons, Inc., New York (1950), pp. 22-25.
Riegel, Industrial Chemistry, Reinhold Publishing Corporation, Fifth Edition (1949), pp. 56-58.

*Primary Examiner*—O. R. Vertiz
*Assistant Examiner*—Wayne A. Langel

[57] ABSTRACT

A process for recovering lithium from sea water in which sea water is repeatedly concentrated at specific gravities between 1.13 and 1.24 to thereby separate salts including common salt from the concentrate, removing the salts which separate from the concentrate, diluting the final concentrate so obtained with water, subjecting the diluted concentrate containing lithium and magnesium to a resin exchange treatment in which lithium and magnesium are absorbed on the resin, and treating the resin with an aqueous hydrochloric acid solution to elute lithium from said resin.

3 Claims, No Drawings

METHOD FOR RECOVERING LITHIUM FROM SEA WATER

BACKGROUND OF THE INVENTION

Lithium in the sea water cannot be disregarded from the viewpoint of resources since the amount of sea water in inexhaustible although the content of lithium in the sea water is only about 0.17 PPM. However, it is disadvantageous to recover lithium directly from the sea water because of too much low concentration.

On the other hand, an industry of concentrating the sea water to obtain common salt and others has been already established. In the mother liquor from which the common salt and others have been separated out, that is brine, lithium must exist concentrated to be several tens times or more.

SUMMARY OF THE INVENTION

The present invention relates to a method for recovering lithium from the sea water. More particularly, the present invention is directed to provide a method for recovering lithium in the sea water from brine as a starting material. Since brine separates out salts as it is concentrated, the salts are subjected to solid-liquid separation and the concentration of brine is repeated. At this time it is important to employ a centrifugal separation or suction filtration to mind that liquid does not adhere to solid. Thus, when the liquid is reduced to one-several tenth of the volume to about 1.4 in specific gravity (at room temperature), the lithium recovery of about 70% is obtained.

DETAILED DESCRIPTION OF THE PREFERRED EMBODIMENT

Among salts other than lithium salts contained in the starting material, sodium salts and potassium salts are almost removed in a solid phase by the fractional crystallization, and magnesium salts are largely removed in a solid phase but a part is remained together with lithium salts in the final concentrate.

The greater part of water in the starting material is vapourized upon concentration, or enters into a solid phase as a water of crystallization when crystals are separated out and thus only a very small amount of water is remained in the final concentrate. In other words, the final concentrate can be said to be a concentrated solution of magnesium chloride containing a high purity of lithium chloride. Since the amount of final concentrate is far smaller in comparison with that of starting material and the amount of magnesium contained is far small in comparison with that at the time of start, lithium salts can be isolated if separation of magnesium and lithium is carried out.

In an aqueous solution in which alkaline earth metal chlorides and lithium chloride co-exist, the ion exchange behavior of these metal ions in case the concentration is low is well known, but in case the concentration of alkaline earth metal ion is high the behavior of these ions is abnormal. The present invention is to separate lithium ion on the basis of a knowledge that, if the aqueous solution is diluted with a minimum amount of water necessary for normal ion behavior of alkaline earth metal, the alkaline earth ions and lithium ion exhibit the same ion exchange behavior as in a dilute solution.

The present invention will be explained more in detail with Example which are not intended to limit the scope of the present invention.

EXAMPLE 30 l of brine of 1.13 in specific gravity at room temperature (23°~27° C.) were concentrated by the treatment shown in the following Table. According to analysis the lithium content of 30 l of the starting material was 195.2 mg.

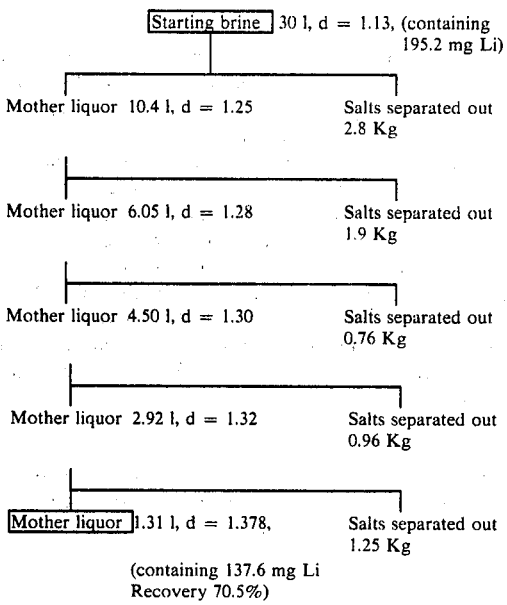

(containing 137.6 mg Li
Recovery 70.5%)

Volume of mother liquor obtained by cooling to room temperature after heating and concentrating and suction filtrating, specific gravity at room temperature and weight of salt separated out were as shown in the table.

The final mother liquor was 1.378 in specific gravity (at room temperature) and was decreased to 1.31 l in volume. The lithium content was 137.6 mg. The revocery of lithium reached 70% in spite of accompanying increased separation of salts.

When 50 ml of chloride solution containing 5.2 g of magnesium (containing a small amount of calcium) and 3.1 mg of lithium were taken and diluted with water by five times, the concentration of magnesium became about 20 mg/ml and the total volume became 250 ml.

This solution was passed through a column of 45 mm in diameter and 250 mm in height containing 400 ml of ion exchange resin, Dia-ion SK, 1 and subsequently 300 ml of water were passed therethrough. Neither lithium ion nor magnesium ion was found in the eluent and, therefore, the both ions were recognized to be adsorbed to the ion exchange resin. Then, on passing 750 ml of 0.5 M hydrochloric acid and subsequently 300 ml of water through the column, almost 100% of lithium were eluted while only below 0.5% of magnesium was eluted. Thus, lighium could be recovered. Thereafter, when passing 500 ml of 6 M hydrochloric acid and subsequently 300 ml of water through the column, all magnesium ions were eluted. The above processes are shown in the following table.

| Stock solution | | Lithium 100%* | Magnesium 100%** |
|---|---|---|---|
| Eluate | Stock solution passed through column + 300 ml of water | 0% | 0% |
| | 750 ml of 0.5 M hydrochloric acid + 300 ml of water | 99.9% | <0.5% |
| | 500 ml of 6 M hydrochloric acid + 300 ml of water | 0.01% | >99.5% |

*Total amount 3.1 mg Li
**Total amount 5.2 g Mg

Further, since the salts separated out in the above described concentration process deliquesced in air, the deliquescence liquid in each step was collect and determined its lithium concentration.

As the result, the deliquescence liquid of salt separated out in the initial stage containing sodium salts predominantly, that in the middle stage containing potassium salts predominantly and that in the final stage containing magnesium salts predominantly were 40 µg/ml, 35 µg/ml and 12 µg/ml, respectively, in lithium concentration. The recovery of lithium will be further increased if lithium is intended to be recovered from these deliquescence liquids since the liquids are considerable in amount.

What is claimed is:

1. A method of recovering lithium from sea water comprising repeatedly concentrating sea water and removing from the brine concentrates the salts including common salt which are separated as a result of the concentration to produce a brine which has a specific gravity of about 1.4 when measured at a temperature of from 23° to 27° C., diluting said brine of about 1.4 specific gravity with water, thereafter passing the diluted brine through an ion exchange resin to accumulate lithium and magnesium ions on the resin, and treating said resin having lithium and magnesium ions thereon with an aqueous hydrochloric acid solution to elute lithium from said resin while magnesium ions remain on said resin.

2. A method of recovering lithium from sea water as set forth in claim 1 in which said brine of about 1.4 specific gravity is diluted with water in an amount which is several times the volume of the brine.

3. A method of recovering lithium from sea water as set forth in claim 2 in which said brine of about 1.4 specific gravity is diluted with water in an amount of about five times the volume of the brine.

* * * * *